(12) United States Patent
Lund et al.

(10) Patent No.: US 6,760,758 B1
(45) Date of Patent: Jul. 6, 2004

(54) SYSTEM AND METHOD FOR COORDINATING NETWORK ACCESS

(75) Inventors: Arnold M. Lund, Louisville, CO (US); Edward Youngs, Boulder, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/386,655

(22) Filed: Aug. 31, 1999

(51) Int. Cl.[7] .............................................. G06F 15/16
(52) U.S. Cl. ...................... 709/217; 709/228; 707/102
(58) Field of Search .............................. 709/217, 228, 709/237, 245, 246; 345/333; 340/7.48; 715/513–516; 707/100–102

(56) References Cited

U.S. PATENT DOCUMENTS

| | | | | |
|---|---|---|---|---|
| 5,911,776 A | * | 6/1999 | Guck ............................ | 709/217 |
| 5,936,547 A | * | 8/1999 | Lund ............................ | 340/7.48 |
| 5,987,100 A | * | 11/1999 | Fortman et al. ............ | 379/88.14 |
| 6,145,084 A | * | 11/2000 | Zuili et al. .................... | 713/201 |
| 6,161,140 A | * | 12/2000 | Moriya ........................... | 709/228 |
| 6,167,441 A | * | 12/2000 | Himmel ........................ | 709/217 |
| 6,233,577 B1 | * | 5/2001 | Ramasubramani et al. . | 709/229 |
| 6,300,947 B1 | * | 10/2001 | Kanevsky .................... | 345/333 |
| 6,345,298 B1 | * | 2/2002 | Moriya ........................ | 709/228 |
| 6,421,706 B1 | * | 7/2002 | McNeill et al. .............. | 709/204 |
| 6,430,624 B1 | * | 8/2002 | Jamtgaard et al. .......... | 709/246 |

OTHER PUBLICATIONS

Rakesh Mohan, John R. Smith and Chung–Sheng Li, Multimedia Content Customization For Universal Access, Nov. 1998.*

* cited by examiner

Primary Examiner—Wellington Chin
Assistant Examiner—Chuong Ho
(74) Attorney, Agent, or Firm—Brooks Kushman P.C.

(57) ABSTRACT

A system and method for coordinating access to a network for a plurality of user devices includes a server configured to establish a placeholder at the server, and control logic configured to retrieve and display a subset of information indicated by the placeholder. The server is connected to the network, and the placeholder indicates information available from the network and is established upon demand from a requesting user device connected to the network and in communication with the server. The control logic retrieves and displays the information, upon demand, at a receiving user device having a device type, with the subset based on the device type.

29 Claims, 2 Drawing Sheets

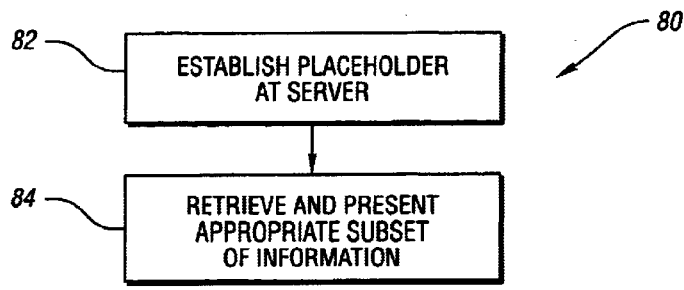
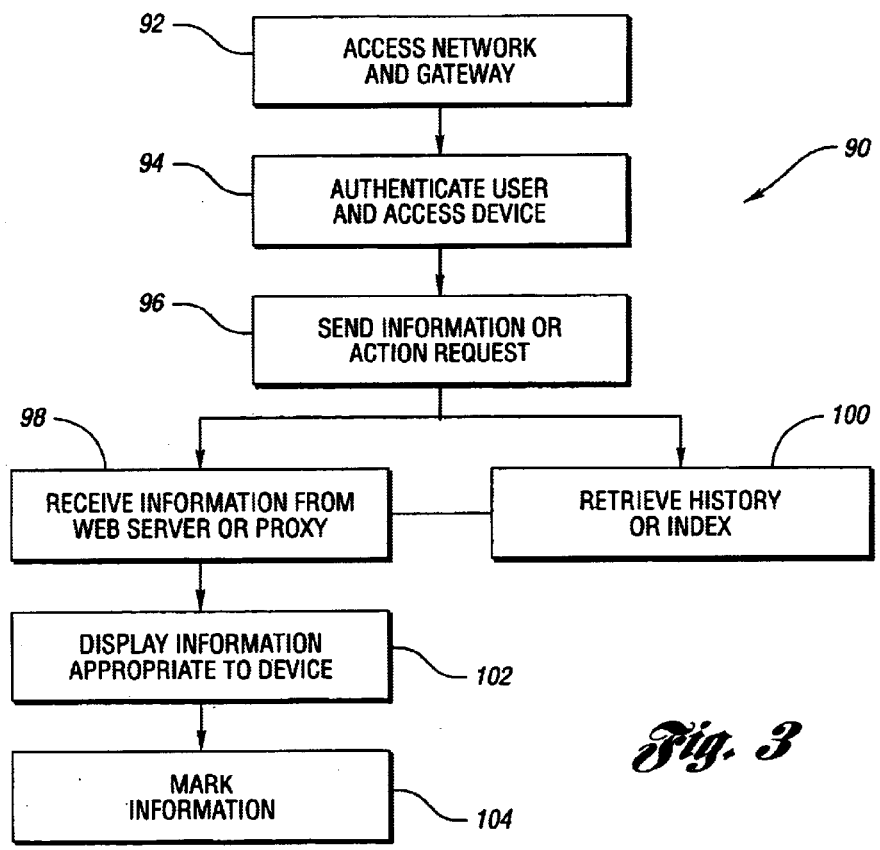

SYSTEM AND METHOD FOR COORDINATING NETWORK ACCESS

TECHNICAL FIELD

The present invention relates to a system and method for coordinating access to a network from a plurality of user devices.

BACKGROUND ART

Today, networks such as, for example, the Internet, have become far reaching. Use of these networks is rapidly becoming part of the day-to-day activities of everyone. Further, in addition to the personal computer, advances in technology have made it possible to access networks, such as the Internet, from other devices, including mobile devices.

Mobile devices with very small screens are increasingly being used to retrieve information from the Internet. This information might include news headlines, e-mail messages, stock quotes, and directory information. While short pieces of information can be effectively retrieved in this way, as the information becomes longer, the small screen interface is no longer practical. Thus, reading a news headline and abstract, or a name, phone number and address of a business might be appropriate; but the full news story or the longer ad copy for the business will often not make sense to read with a small screen while moving from place to place.

For the foregoing reasons, there is a need for a system and method for coordinating access to a network from a plurality of user devices that allow a user to access information as needed in a format appropriate for the particular device being used.

DISCLOSURE OF INVENTION

It is, therefore, an object of the present invention to provide a system and method for coordinating network access that allows a user to mark information with a placeholder using one type of device, and later retrieve or act on the information using a different device.

In carrying out the above object, a system for coordinating access to a network from a plurality of user devices is provided. The system comprises a server connected to the network and configured to establish a placeholder at the server, and control logic configured to retrieve the information indicated by the placeholder. The placeholder indicates information available from the network and is established upon demand from a requesting user device connected to the network and in communication with the server. The control logic is configured to retrieve the information indicated by the placeholder and to display a subset of the retrieved information, upon demand, at a receiving user device having a device type. The subset of information is based on the device type. That is, based on the device type, an appropriate subset of the information indicated by the placeholder is displayed to the user.

For example, a user may mark information with a placeholder when using a device such as a personal communication system (PCS) phone, and later retrieve or act on the information using a second device such as a workstation, personal computer, printer, fax, or other device. A small subset of information may be displayed on a browser on the phone, while all of the information (a subset that is the full set) may be displayed when later accessing the information from a workstation or personal computer.

In accordance with the present invention, the placeholder may be implemented in a variety of ways including as information in a cache at the server, as a link to a different server, as a cookie, or as a browser (located at the server). When the placeholder is implemented as a browser at the server, that is, a proxy-browser, the browser may be configured with additional features such as the ability to accept a cookie, the ability to store at least one user preference, the ability to store at least one user history entry, and/or the ability to store at least one user bookmark. Accordingly, the user may access the network, such as the Internet, from a plurality of devices using the proxy-browser. As such, the type of device being used to access the network is transparent to the sites being accessed, because all of those sites only see the proxy-browser at the server.

Further, in accordance with the present invention, the control logic and server may be implemented in a plurality of ways. For example, the control logic may be located at the server, or the user device may be connected to the network through a gateway with the control logic located at the gateway. Further, the server may be a proxy-server that connects the gateway to the network, with the proxy-server implemented as either software running on the gateway or as hardware such as a stand-alone server connected to the gateway. Further, the device may connect to the network through a gateway, with the server being remote from the gateway. In accordance with the present invention, although the server is a remote server, the system may be configured such that the user device accesses the server and the server is operative as a proxy-server that controls access to the network for the user device. Alternatively, the remote server may be configured such that the user device periodically checks in with the server and the gateway controls access to the network for the user device (that is, embodiments of the present invention are not limited to use with a proxy-server but may be implemented in other ways as well). Still further, users at a local gateway where the server is may use the server as a proxy-server, while users at a remote gateway may use a check-in technique.

Still further, in accordance with the present invention, because the server is configured to allow a plurality of different devices to access information on the network and share placeholders, the server may be operative as a unified messaging server or may utilize a unified messaging server in accordance with the placeholders to provide additional multiple device functionality. In one embodiment, the information indicated by the placeholder is translated into the appropriate subset for the user device when the user device requests access to the marked information. The translation may occur at the server, or may occur at the gateway to leave open the possibility for network access from a plurality of different devices that may access the network through a plurality of different gateways, while still utilizing the place holding abilities of the server. Further, instead of translating on demand for access to the information, the place held information may be pre-translated into a plurality of subsets corresponding to the plurality of device types with the pre-translated information stored at the server. When pre-translation is utilized, it may be more appropriate to pre-translate at the server, but of course it is appreciated that pre-translated information may be stored at one or more gateways when the server is a remote server, if appropriate for a particular application. Even further, in some embodiments, all information may be sent to the device with the subset being determined at the device and then displayed to the user.

Further, in carrying out the present invention, a method for coordinating access to a network from a plurality of user devices is provided. The method comprises establishing a placeholder at a server connected to the network, and retrieving the information indicated by the placeholder and displaying a subset of the retrieved information. The placeholder indicates the information available from the network and is established upon demand from a requesting user device connected to the network and in communication with the server. The information is retrieved and a subset of the information is displayed, upon demand, at a receiving user device having a device type, with the subset being based on the device type.

Of course, in accordance with methods of the present invention, the placeholder may be implemented in a variety of ways, including a proxy-browser implementation. Still further, it is appreciated that methods of the present invention may employ on demand translating or pre-translating of the information into appropriate subsets based on the device types of the information retrieving devices. Further, in the alternative, the device itself may determine the appropriate subset and then display that subset.

The advantages associated with embodiments of the present invention are numerous. For example, embodiments of the present invention enable a user to use information that is needed while mobile, and to mark information for automatic, rapid and easy retrieval when the user returns to a different device such as a workstation, printer, fax, or other device capable of displaying a larger subset of information than the mobile device.

The above object and other objects, features, and advantages of the present invention are readily apparent from the following detailed description of the best modes for carrying out the invention when taken in connection with the accompanying drawings.

BRIEF DESCRIPTION OF DRAWINGS

FIG. 2 is a block diagram illustrating a method of the present invention for coordinating access to a network from a plurality of user devices; and FIG. 3 is a block diagram illustrating a preferred embodiment of a method of the present invention for coordinating access to a network from a plurality of user devices.

BEST MODES FOR CARRYING OUT THE INVENTION

Figure 1:
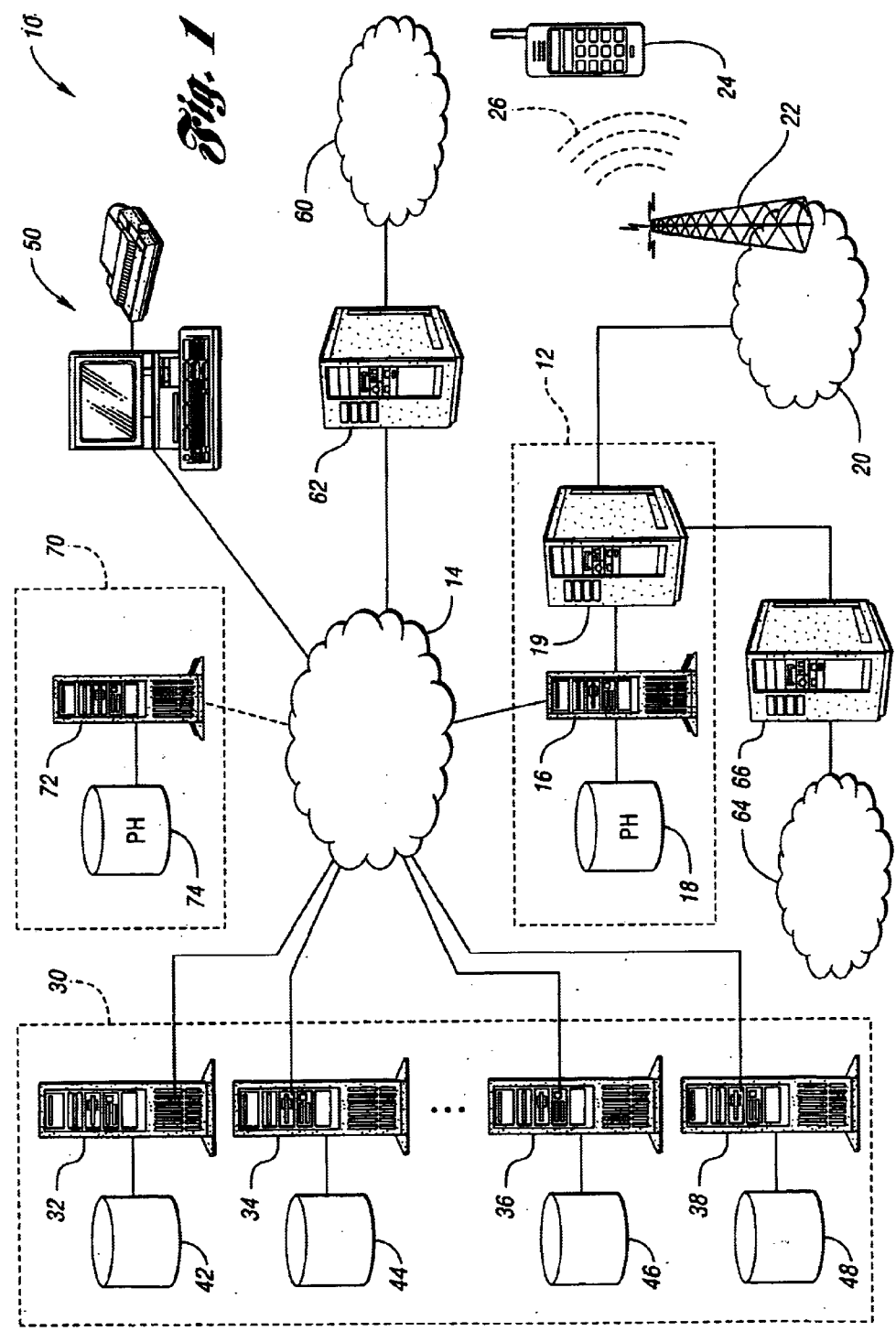
FIG. 1 is a system of the present invention in a network environment.

With reference to FIG. 1, a networking environment is generally indicated at 10. An exemplary implementation of a system of the present invention for coordinating access to the network from a plurality of user devices is indicated at 12. A network such as, for example, the Internet, is indicated at 14. In the exemplary embodiment of the present invention, a server 16 stores placeholder information in a database 18. A gateway 19 is connected to server 16 to allow other networks to access network 14 through server 16. Of course, it is appreciated that server 16 may reside on gateway 19 as software, or may be implemented in hardware as shown. Further, database 18 may be implemented in a variety of ways as is appreciated by those skilled in the art. That is, systems of the present invention are independent of any particular hardware configuration and any particular network arrangement, and embodiments of the present invention may be implemented in a variety of known networking arrangements including various hardware and software configurations.

With continuing reference to FIG. 1, in the exemplary embodiment illustrated with server 16 located at gateway 19, network 20 connects to network 14 through gateway 19. As shown, network 20 is a carrier network for mobile devices that may be implemented in any number of different known network technologies. For example, traffic over network 20 may be controlled with code division multiple access (CDMA), time division multiple access (TDMA), frequency division multiple access (FDMA), cellular digital packet data (CDPD), global system for mobile communications (GSM), or any other known techniques or combinations of known techniques.

As shown, network 20 has a tower antenna 22 for communicating with mobile devices 24 as indicated at 26. Of course, other networks may connect to gateway 19, and access to network 14 through gateway 19 is not limited to any specific type of network and network 20 is merely one example. Devices that connect to network 14, such as mobile devices 24 accessing network 14 through gateway 19, may visit various information sites shown as a group of servers 30. For example, network servers 32, 34, 36, 38, and corresponding databases 42, 44, 46, and 48, may be accessed by devices connected to network 14. In accordance with the present invention, server 16 and associated control logic are configured to establish placeholders on demand, and display appropriate information subsets at device 24 and other devices, as is described below in greater detail. Of course, there are many other ways to access network 14, such as with a personal computer generally indicated at 50. Although not specifically shown, computer 50 may connect through a local gateway or any other known technique for connecting to network 14. Further, as is known in networking, additional networks may also be connected to network 14. For example, network 60 connects to network 14 through gateway 62. Of course, the technique for connecting multiple networks together need not take any particular form, and connection through gateway 62 is one example. In another example, network 64 connects through gateway 66, and through gateway 19, to reach network 14.

As such, the overall network environment may involve a number of different networks connected through a number of different gateways, with different portions of the network formed of a variety of different mediums. For example, portions of the overall network environment may be fiber, with other portions being copper twisted pair, other portions being coaxial cable, and other connections between different parts of the network being made by satellite, or being made by any other known technique for transmitting information. As such, embodiments of the present invention are not limited to any particular network architecture, but may be found to be very useful with the existing Internet.

As mentioned previously, the server 16 of system 12 is shown with the gateway 19. In the alternative, the server may be a remote server and database as indicated at 70, with server 72 and placeholder database 74. In accordance with the present invention, a gateway need not be located at the server. Although when a gateway is located at the server, some devices may access network 14 through the gateway that is at the server, such as mobile devices 24 in the example illustrated, additional devices such as computer 50 that access network 14 may still use server 16 as a proxy, or may check in with server 16 when accessing network 14 even though computer 50 accesses network 14 through a different path than through gateway 19. As such, server 72 may be employed in the alternative, and accordingly, all devices that access network 14 through their own local gateway may then use server 72 as a proxy or achieve embodiments of the present invention by periodically checking in with server 72 (to avoid a potential traffic jam at server 72).

With reference to FIGS. 1 and 2, and specifically to FIG. 2, the general network access coordination technique of the present invention is indicated at 80. At block 82, a placeholder is established at server 16 (FIG. 1). Or, in the alternative, placeholders are established at alternative server 72. That is, a device that is accessing the network, upon demand by a user, communicates to server 16 to cause server 16 to establish a placeholder at the server. A placeholder may be stored in placeholder database 18. A placeholder indicates information available from the network, such as information from any one of the servers in group 30. The device may be, for example, a mobile device 24 that contacts server 16 through gateway 19, or may be a different device such as a device connected to network 60. Whatever device is being used, the user may find information through network 14 and desire to mark that information with a placeholder. Accordingly, the user device contact server 16 and server 16 establishes the placeholder (or in the alternative, server 72).

At block 84, the information is retrieved and displayed at a retrieving user device. Accordingly, the appropriate subset of the retrieved information is displayed. That is, once the placeholder has been established by server 16 (or in the alternative by server 72), the user may access network 14 in any known way, such as through network 60, through network 64, through network 20 and gateway 19, from computer 50, or from any other connection to network 14, and request the information indicated by the placeholder. Upon that request, the user device contacts server 16 (or server 72 in the alternative) and indicates that it is desired to retrieve the information indicated by the placeholder.

Server 16 (or 72) causes the information to be retrieved from, for example, one of the servers in group 30, and an appropriate subset of that information is displayed on the user device. The subset is based on the particular device type. Of course, it is appreciated that server 16 (or 72) may act as a proxy with the retrieved information passing through server 16 (or 72) on its way to the retrieving device, or server 16 (or 72) may be contacted in a check-in manner wherein the retrieved information passes directly from its source to the appropriate gateway to the accessing user device. As such, it may be preferred to determine the appropriate subset of information, that is, translate the information, at the local gateway to the retrieving user device. In the alternative, the appropriate subset may be determined at server 16 (or server 72) with information passing through the server on the way to the retrieving user device. Or, it may be possible to perform translation at the actual place where the desired information resides, for example, at a server in server group 30. Still further, all information may be sent to the device and the device then determines and displays the appropriate subset.

Although the general operation of systems and methods of the present invention has been described above with reference to FIGS. 1 and 2, a more detailed description of an exemplary implementation of the present invention is described below with reference to the system of FIG. 1 and the block diagram of FIG. 3. That is, in an exemplary implementation, FIG. 3 shows how an embodiment of the present invention would work from the user's perspective. In this example, network 14 is the Internet.

Of course, embodiments of the present invention may be employed in other networking environments. With the method generally indicated at 90 in FIG. 3, at block 92, the user may access a Web-reliant information source using a device such as their PCS phone (24, FIG. 1). The user is identified and authenticated at block 94. The user may then request information such as a list of the latest news headlines at block 96. The gateway application could translate this request into a request to a server on the web (server group 30, FIG. 1) and retrieve the relevant information at block 98. The subset of that information that would be appropriate to display on the access device (the PCS phone in this case) would be formatted and displayed or printed, at block 102. Of course, it is appreciated that the subset may be determined by an application on the gateway or on the server (or at the other end server in group 30, or even at the device itself).

On the PCS device, the user may see a set of headlines through which he or she would scroll. If the user saw stories of interest he or she could mark them at block 104. Marking, or establishing a placeholder, would result in the information being associated with that user and stored for later retrieval from a placeholder database (18, FIG. 1). Later, when the user wanted to read the full stories, and perhaps access multi-media information about the stories, the user would access the network through a gateway, possibly a different gateway. Information at server 16 may be represented to the user as a function on their browser. The user would be authenticated by server 16, for example, by either explicitly or implicitly using a map of Internet protocol (IP) addresses. The user may either request or automatically be presented with a list of headlines or other information that they had marked previously, at block 100. By selecting a headline, the full story would be presented to or printed as appropriate.

While the general concept of the invention is the ability for a user of a device like a PCS phone to mark information (establish placeholders) so that full content can be accessed later from a workstation, the implementation of the placeholder may take many forms. That is, from the Web's perspective, information is being served to a virtual client. A user can interact with the Web through different devices over time, and it will seem to Web servers that the user is consistently using a single device. That is, translation (establishing the subsets) takes place either at the local gateway or the server with the appropriate control logic, and is transparent to the web servers on the other end. Further, in some applications, translation may take place at the device. (Of course, as mentioned previously, some application may not desire this transparency and in such an application, the translation may take place at the content server on the far end.) This means that it does not matter which combination of devices are being used.

The present invention applies to moving from workstation to workstation, or PCS phone to organizer, as easily as it applies to moving from a PCS phone to a workstation. Further, embodiments of the present invention are not restricted to any certain type of information access such as reviewing news stories, and could be used for multi-point control of a unified messaging product or for completing a portion of a form from one device and the remainder from another device. Embodiments of the present invention apply to remembering the user's browsing history across devices just as easily as embodiments apply to explicitly marking information for retrieval. Any device may be able to mark/send a reference to any other device. The variety of information (for example, addresses, phone numbers, reminders, headlines, etc.) for which embodiments of the present invention may be beneficial to have a variety of views as users move from device to device, is virtually unlimited.

With continuing reference to FIG. 1, the exemplary implementation of a system of the present invention is described below in further detail. A device 24 accesses carrier network 20, communicating with an appropriate protocol such as, for example, code division multiple access (CDMA). The user accesses gateway 19, which preferably serves as the translator to determine appropriate information subsets. Of course, as mentioned previously, translation need not occur at gateway 19 and may alternatively occur at server 16 or if other servers on the network are configured appropriately, at any of the servers in server group 30. Of course, translation at the gateway allows the optional placement of the server and placeholder database away from the gateway such as at 70. Further, translation at the gateway may be implemented at a number of different gateways such that different devices access network 14 through different gateways, with the appropriate gateway performing translations to determine subsets of information as needed. That is, control logic at the gateway hides the placeholders from the Web sites, and hides the device type from server 16 or 72.

The user is authenticated either implicitly by the gateway (using an identification available from the device) or explicitly by the user entering a password and log-in. It is worth noting that through authentication, identification, and the gateway being accessed, in the exemplary implementation, the gateway knows something about the user and about the properties of the device being used to access the network. As such, the gateway is a suitable place for translation to occur. Further, the gateway may serve as a browser optimized for the device, with this browser the user could request information from various web sites. That is, the gateway may serve as a browser with the placeholder information being located at the server. In the alternative, the server may serve as the browser. That is, the browser functionality need not be provided at the same location as the placeholder information.

The gateway may also be configured to run applications that provide the user with menus of available information (placeholder index) when the user selects a web site or other source of information, the gateway application turns the request into an appropriate query such as a hypertext mark up language (HTML) or handheld device mark up language (HDML) query, and requests information from the appropriate server. When the information is returned, it may be cached by the server if desired. An appropriate subset of the information is determined and presented to the user. The subset may be determined (translation) at the gateway. As such, in the example, the gateway delivers the subset of information over the carrier network to the user's device.

As the user scans the information available over the network, the application (running on the gateway or server) provides a way for the user to mark pieces of information with placeholders (at the server). Placeholders are saved for subsequent rapid retrieval and display (of a subset of information showing greater detail). The user may possibly enter the mark or placeholder by pressing a key or combination of keys on the access device. A program runs either in the gateway or in the server and may implement the placeholder in a variety of ways. Of course, the server may run on the gateway (i.e., a gateway/server). For example, the placeholder may include information that is cached at the server, a link to a different server, or a cookie.

Further, as mentioned previously, the placeholder may be implemented with browser functionality. As such, the server may run a proxy-browser for the user, or the gateway may run a browser application with the placeholder information being stored at the server. On demand by the user, the placeholders are sent to the user such that the user may select a particular placeholder from the list, and then the user will be able to retrieve the marked information in an appropriate format for the device being used to access the network. That is, on a handheld device, a title and/or abstract may be an appropriate subset. On the other hand, when retrieving the information indicated by the placeholder with a personal computer, it may be more appropriate to display all of the information. That is, the term "subset" is not limited to proper subsets, and a suitable subset may be all of the information available.

As mentioned previously, the placeholder at the server, in accordance with the present invention, may take many forms. As described above, a placeholder may include information in a cache at the server or may include links to different servers. On the other hand, the placeholder may include a cookie. That is, instead of storing a cookie at the client as is traditionally done, embodiments of the present invention may store cookies in the placeholder database. As such, a user may share his or her cookies among a plurality of different devices because the cookies are stored at the server in the placeholder database. Thus, Web servers connected to network 14 will receive their cookies upon access by the user with any of the different user devices, and send appropriate information out to the user independent of the device used to access the web server (when translation is not at the content server, that is, translation could appropriately take place at the user's gateway).

Thereafter, the server, or an application at the gateway, may further personalize the information by determining the appropriate subset of the information for presentation to the user. The cookies at the server may be implemented as placeholders with or without additional browser functionality. That is, the browser may still be completely located at the user device, however, the placeholders may be implemented such that all (or some) cookies are held at the server.

In an alternative implementation, the placeholder implementation may include a browser. That is, different user devices browse network 14 through the proxy browser at server 16. As such, the proxy browser may be configured to support cookies, to store user preferences, to store user history, to store user bookmarks, and to provide other features of a browser. As such, a user can switch from device to device while browsing the network with the same browser. Accordingly, the proxy browser receives information from various web sites on the network, and an application at the server or the gateway performs the necessary translation to present the appropriate subset of information to the user device.

Advantageously, cookies at the server, and more advantageously when a full browser implementation is at the server, the user can move from access device to access device while maintaining the kind of continuity that would normally only be associated with repeated sessions from a single device. In these implementations, for example, the user could fill out part of a form using one access device but if the user needs to locate additional information to complete the form, the user can later access the same form to complete it from a different access device. For example, the user could begin filling out a form using a PCS phone, and then continue later using a personal computer. In the proxy browser implementation, from the web's perspective, a user is accessing and interacting with information in the typical way from the browser. From the user's perspective, the user is able to move from device to device, with a seamless experience over time and only changes as would be appropriate for the context of use.

Of course, as mentioned previously, the placeholder may be implemented in a variety of different ways. In another example, placeholder functionality could be implemented with an application running on the gateway or server that takes the placeholder information and embeds links into an e-mail message sent to an address specified by the user. Alternatively, the e-mail address may be sent to an intermediary e-mail application identified to the user. Further, a message holding the placeholder information could be sent to a different server, such as a unified message server. In a unified messaging application, the user could retrieve placeholder information made with various devices, through a variety of different devices including receiving the placeholder information in a variety of different media forms such as over a telephone, through a fax machine, and a browser on a handheld device, or in a browser on a computer.

As such, it is appreciated that the broad concept of the present invention utilizes a server configured to establish a placeholder at the server, and control logic configured to retrieve the information indicated by the placeholder and to display a subset of the retrieved information, upon demand, at a receiving user device having a device type. The subset is based on the device type. It is appreciated by those skilled in the art that the placeholder may take many different forms, including but not limited to, information in a cache at the server, a link to a different server, a cookie, a browser, with the browser configured to perform any of: accepting a cookie, storing at least one user preference, storing at least one user history entry, or storing at least one bookmark. Further, it is appreciated that the control logic that retrieves the information and presents the subset may be located at the server, or at a gateway. The server and the gateway need not be located together, that is, other different gateways may access the server over the network. Further, all information may be sent to the device, and the appropriate subset may be determined at the device.

Further, the server may be connected to the network and not have its own gateway such that all access to the server is through different gateways of the network (for example, server 72). Still further, in accordance with the present invention, the server may be configured such that all network access in accordance with the present invention goes through the server such that the server operates as a proxy-server, controlling access to the network for the user device. Or, alternatively, the user device may periodically check in with the server and the gateway will control access to the network for the user device. Still further, it is appreciated by those skilled in the art that the appropriate subsets of information for different user devices may be determined on demand, or embodiments of the present invention may be implemented such that pre-translations into a plurality of subsets corresponding to a plurality of different device types is performed.

While the best modes for carrying out the present invention have been described in detail, those familiar with the art to which this invention relates will recognize various alternatives, designs and embodiments for practicing the invention as defined by the following claims.

What is claimed is:

1. A system for coordinating access to a network from a plurality of user devices, the system comprising:
   a server connected to the network and configured to establish a placeholder at the server, the placeholder indicating information available from the network and being established upon demand from a requesting user device connected to the network and in communication with the server; and
   control logic configured to retrieve the information indicated by the placeholder and to display a subset of the retrieved information, upon demand, at a receiving user device having a device type, the subset being based on the device type.

2. The system of claim 1 wherein the placeholder includes information in a cache at the server.

3. The system of claim 1 wherein the placeholder includes a link to a different server.

4. The system of claim 1 wherein the placeholder includes a cookie.

5. The system of claim 1 wherein the placeholder includes a browser.

6. The system of claim 5 wherein the browser is configured to accept a cookie.

7. The system of claim 5 wherein the browser is configured to store at least one user preference.

8. The system of claim 5 wherein the browser is configured to store at least one user history entry.

9. The system of claim 5 wherein the browser is configured to store at least one user bookmark.

10. The system of claim 1 wherein the control logic is located at the server.

11. The system of claim 1 wherein the user device is connected to the network through a gateway, and wherein the control logic is located at the gateway.

12. The system of claim 1 wherein the user device is connected to the network through a gateway, and wherein the server is a proxy-server that connects the gateway to the network.

13. The system of claim 1 wherein the user device is connected to the network through a gateway, and wherein the server is remote from the gateway.

14. The system of claim 13 wherein the server is configured such that the user device accesses the server and the server is operative as a proxy-server that controls access to the network for the user device.

15. The system of claim 13 wherein the server is configured such that the user device periodically checks in with the server and the gateway controls access to the network for the user device.

16. The system of claim 1 wherein the server is operative as a unified messaging server.

17. The system of claim 1 wherein the information indicated by the placeholder is pretranslated into a plurality of subsets corresponding to a plurality of device types.

18. A method for coordinating access to a network from a plurality of user devices, the method comprising:
    establishing a placeholder at a server connected to the network, the placeholder indicating information available from the network and being established upon demand from a requesting user device connected to the network and in communication with the server; and
    retrieving the information indicated by the placeholder and displaying a subset of the retrieved information, upon demand, at a receiving user device having a device type, the subset being based on the device type.

19. The method of claim 18 wherein the placeholder includes information in a cache at the server.

20. The method of claim 18 wherein the placeholder includes a link to a different server.

21. The method of claim 18 wherein the placeholder includes a cookie.

22. The method of claim 18 wherein the placeholder includes a browser.

23. The method of claim 22 wherein the browser is configured to accept a cookie.

24. The method of claim 22 wherein the browser is configured to store at least one user preference.

25. The method of claim 22 wherein the browser is configured to store at least one user history entry.

26. The method of claim 22 wherein the browser is configured to store at least one user bookmark.

27. The method of claim 18 further comprising:
    pretranslating the information indicated by the placeholder into a plurality of subsets corresponding to a plurality of device types.

28. The method of claim 18 further comprising:
    determining the subset of information to be displayed; and thereafter, sending the subset of information to the user device.

29. The method of claim 18 further comprising:
    sending the information indicated by the placeholder to the user device; and
    thereafter determining the subset of information to be displayed.

* * * * *